United States Patent [19]

Ida

[11] Patent Number: 5,435,044
[45] Date of Patent: Jul. 25, 1995

[54] CORD TIGHTENING DEVICE

[75] Inventor: Kazuo Ida, Toyama, Japan

[73] Assignee: Yoshida Kogyo K.K., Tokyo, Japan

[21] Appl. No.: 229,223

[22] Filed: Apr. 18, 1994

[30] Foreign Application Priority Data

Apr. 16, 1993 [JP] Japan .................. 5-090028
Sep. 10, 1993 [JP] Japan .................. 5-226138

[51] Int. Cl.⁶ ............................................. F16G 11/00
[52] U.S. Cl. .............................. 24/136 R; 24/115 M; 24/136 L; 403/211
[58] Field of Search ............. 24/136 R, 136 L, 136 K, 24/115 M; 403/211

[56] References Cited

U.S. PATENT DOCUMENTS

| | | |
|---|---|---|
| 3,897,161 | 7/1975 | Reinwall, Jr. . |
| 3,965,544 | 6/1976 | Boden . |
| 4,156,574 | 5/1979 | Boden ................ 403/211 |
| 4,379,358 | 4/1983 | Wibrow ............. 24/136 R |
| 4,665,590 | 5/1987 | Udelhofen et al. ...... 24/136 R |
| 4,765,034 | 8/1988 | Kasai . |
| 4,788,735 | 12/1988 | Kasai ................ 24/136 R |
| 4,807,333 | 2/1989 | Boden ............... 403/211 |
| 4,878,269 | 11/1989 | Anscher et al. ...... 24/136 R |

FOREIGN PATENT DOCUMENTS

| | | |
|---|---|---|
| 0248290 | 12/1987 | European Pat. Off. . |
| 2579286 | 9/1986 | France . |
| 57-42552 | 9/1982 | Japan . |
| 2-46731 | 11/1990 | Japan . |
| 4-44575 | 10/1992 | Japan . |
| 719916 | 12/1954 | United Kingdom . |
| WO88/02077 | 3/1988 | WIPO . |

Primary Examiner—Victor N. Sakran
Attorney, Agent, or Firm—Hill, Steadman & Simpson

[57] ABSTRACT

A cord tightening device comprises a case having a pair of front and rear plates and a pair of opposite lateral walls interconnecting the front and rear plates and having forwardly converging inner surfaces defining a small-width opening at one end thereof and a large-width opening at the other end thereof, and a sliding member slidably disposed inside the case and having pressing parts formed on opposite lateral surfaces thereof and adapted to press a cord against the opposite lateral walls of the case. The cord tightening device is provided on at least one sliding surface of either one of said case and said sliding member taken as a set with a sliding groove and on at least one sliding surface of the remaining member of the set with a sliding protrusion fit for insertion into said sliding groove. The sliding groove has a regulating part for preventing the sliding protrusion from throwing off the sliding groove, and a lateral surface of either one of the sliding protrusion and the regulating part facing to the other member is slanted to form a slanted part for guiding insertion of the sliding protrusion into the sliding groove.

25 Claims, 15 Drawing Sheets

CORD TIGHTENING DEVICE

BACKGROUND OF THE INVENTION

1. Field of the Invention

This invention relates to a cord tightening device made of synthetic resin and used for tightening cords which are fitted on anoraks, rucksacks, life jackets, shopping bags, etc. for the purpose of tightening them.

2. Description of the Prior Art

As a tightening device of this kind, the rope tightening device which comprises an angularly columnar hollow body formed of a top wall and a bottom wall separated parallelly from each other and opposed lateral walls and a movable arm device disposed inside the hollow body, the movable arm device being provided with four grip parts endowed with springiness and disposed as opposed to the lateral walls of the hollow body so as to allow insertion therebetween a rope or a cord bent in the shape of a loop and press the rope or cord against the lateral walls of the body thereby tightening it, and the rope tightening device further comprising a built-in release device capable of being manually operated to relieve the grip parts of the work of exerting pressure on the rope has been known (see Japanese Patent Publication No. SHO 57-42,552).

As another cord tightening device of the kind under discussion, the cord tightening device which comprises a hollow body of a generally trapezoidal plan view and a slider, the hollow body being provided in the opposite end parts thereof with a small-width opening and a large-width opening and on a front plate thereof with a slide hole, and the slider being provided with a tightening part for tightening cord portions by pressing them against the lateral plates of the body and an operating part integral with the tightening part and protruding from the surface of the hollow body through the slide hole bored in the front plate is disclosed in Japanese Utility Model Publication No. HEI 2-46,731 and the corresponding U.S. Pat. No. 4,765,034 issued Aug. 23, 1988 to Kasai. In this cord tightening device, the slider is provided with an aperture larger than the outer boundary of the operating part, and the operating part is resiliently cantilevered to the tightening part and normally overlying the aperture. The front plate is provided on the rear surface thereof at the large-width opening side of the body with a guide groove for guiding the operating part of the slider in the direction of the slide hole of the hollow body.

Besides, the loop tie clasp which comprises a hollow body of a generally trapezoidal plan view provided at each of the opposite ends thereof with an opening so shaped as to permit insertion therethrough of a loop tie and a slider disposed in the hollow body so as to nip the opposed halves of the loop tie in cooperation with the lateral walls of the hollow body, the hollow body having a guide hole formed in the front plate of the body in a shape similar to the outer boundary of the body and a stopper piece adapted to prevent the loop portion of the tie from entering tile hollow body and disposed in the center of the large-width opening at one end part of the body between the front plate and the rear plate of the body, and the slider having an operating part projected therefrom and adapted to be inserted in the guide hole so as to protrude from the front surface through the guide hole and attain operation of the slider from the front surface of the hollow body is disclosed in Japanese Utility Model Publication No. HEI 4-44,575.

In the first case of the heretofore known cord tightening devices cited above, since the opposite lateral walls of the hollow body or the case are parallel or symmetrically arcuate, the grip parts of the movable arm device for nipping a cord in cooperation with the case nip one and the same cord at two points thereof and the gripping actions produced by the grip parts in this case are exerted in mutually opposite directions. The release device for relieving the grip parts of the work of nipping the cord is disposed at two points on each of the lateral sides so as to fulfill the function thereof at a total of four points. The movable arm device and the release device are separately formed or two movable devices are formed instead and a spring is interposed therebetween. Thus, they greatly add to the complexity of construction of the whole cord tightening device. Moreover, since the grip parts are caused by the spring to generate contradictory actions, the operation for releasing the cord does not always proceed smoothly to effect release of the cord infallibly.

Then, in the case of the second and the third example, since the operating part for governing the actions of the slider so as to nip the cord or the loop tie in cooperation with the hollow body is disposed so as to protrude from the front surface of the hollow body, the operating part has the possibility of touching some other object and, as a result, readily loosing the cord and depriving the cord tightening device of the tightening effect thereof. Further, the protrusion of the operating part from the front surface of the hollow body forms a detrimental factor from the standpoint of design.

Further, in the case of the third example, since the guide hole similar in shape to the outer boundary of the hollow body is formed in the front plate of the hollow body and, as a result, the operating part of the slider is allowed to reciprocate in both the longitudinal and the lateral direction and the slider is allowed to change position freely toward the lateral walls of the hollow body, the clasp functions satisfactorily as a cord tightening device which is not exposed to the tension of a cord such as a loop tie. In a cord tightening device which is exposed directly to a tension, however, the clasp is incapable of playing the role of a tightening device.

SUMMARY OF THE INVENTION

It is therefore an object of the present invention to provide a cord tightening device which is endowed with simplicity of construction and moreover furnished with the function of allowing a sliding member for nipping a cord to operate conveniently, nipping the cord with great strength, and retaining the cord infallibly in the nipped state and which, therefore, is utilizable as clasping means for cords of all kinds and excellent in terms of design.

The cord tightening device of the present invention allows a case and a sliding member to be opposed to each other in a one-to-one correspondence by having a sliding groove formed in the sliding surface of either of the case and the sliding member taken as a set and a sliding protrusion for insertion into the sliding groove raised from the sliding surface of the remaining member of the set. Moreover, the opposed lateral surfaces of the case and the sliding member to be slidably inserted into the case are so configured that a difference in the gap therebetween may be produced by the sliding motion of the sliding member carried out at a defined position.

This gap is utilized for the nipping of a cord. Thus, the sliding motion of the sliding member in the case brings about an effect of infallibly generating a nipping action.

Further, by providing the sliding groove with a slanted part for guiding a sliding protrusion and a regulating part for preventing the sliding protrusion from throwing off, the operation of inserting the sliding protrusion into the sliding groove can be carried out easily and conveniently and the sliding protrusion will not easily throw off once it has been inserted into the sliding groove. Thus, there can be obtained an effect of infallibly ensuring lasting retention of the sliding member inside the case.

The sliding groove and the sliding protrusion are disposed as opposed to each other on the inner surface of the front plate or the rear plate of the case and on the front surface or the rear surface of the sliding member. This arrangement prevents the case from exposing any of the components contained therein to sight. Thus, the cord tightening device of the present invention has a highly presentable appearance.

In one aspect of the present invention, the cord tightening device comprises (a) a case or hollow body having a front plate, a rear plate and a pair of opposite lateral walls interconnecting the front and rear plates and having forwardly converging inner surfaces and (b) a sliding member slidably disposed inside the case and having pressing parts formed on the opposite lateral surfaces thereof, the pressing parts being adapted to press a cord against the opposite lateral walls of the case and nip the cord between the opposite lateral walls of the case and the pressing parts, the cord tightening device being provided on a sliding surface of either of the case and the sliding member taken as a set with a sliding groove and on a sliding surface of the remaining member of the set with a sliding protrusion fit for insertion into the sliding groove, the sliding groove having a regulating part for preventing the sliding protrusion from throwing off the sliding groove, and a lateral surface of either of the sliding protrusion and the regulating part facing to the other member being slanted to form a slanted part for guiding insertion of the sliding protrusion into the sliding groove.

In a preferred embodiment of the present invention, the sliding member has operating parts integrally formed in the leading and trailing ends of the sliding member in such a manner that the operating parts are exposed through opposite openings formed in the leading and trailing ends of the case. Preferably, the cord pressing parts are disposed along the opposite lateral surfaces of the sliding member so as to endow it with springiness. Otherwise, arcuate arms may be resiliently projected from the sliding member along the opposite lateral surfaces of the sliding member to form the pressing parts.

In another preferred embodiment of the present invention, a plurality of engaging projections may be arranged in a longitudinal row each on the sliding surface of either of the case and the sliding member taken as a set and an engaging ridge may be arranged in a lateral direction on the sliding surface on the remaining member of the set, with the engaging projections and the engaging ridge so formed as to make and break mutual engagement selectively. A plurality of engaging projections may be parallelly arranged in a longitudinal row each along the opposite sides of the sliding groove formed in the sliding surface of either of the case and the sliding member taken as a set and engaging ridges may be arranged in a lateral direction along the opposite sides of the sliding surface of the remaining member of the set.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
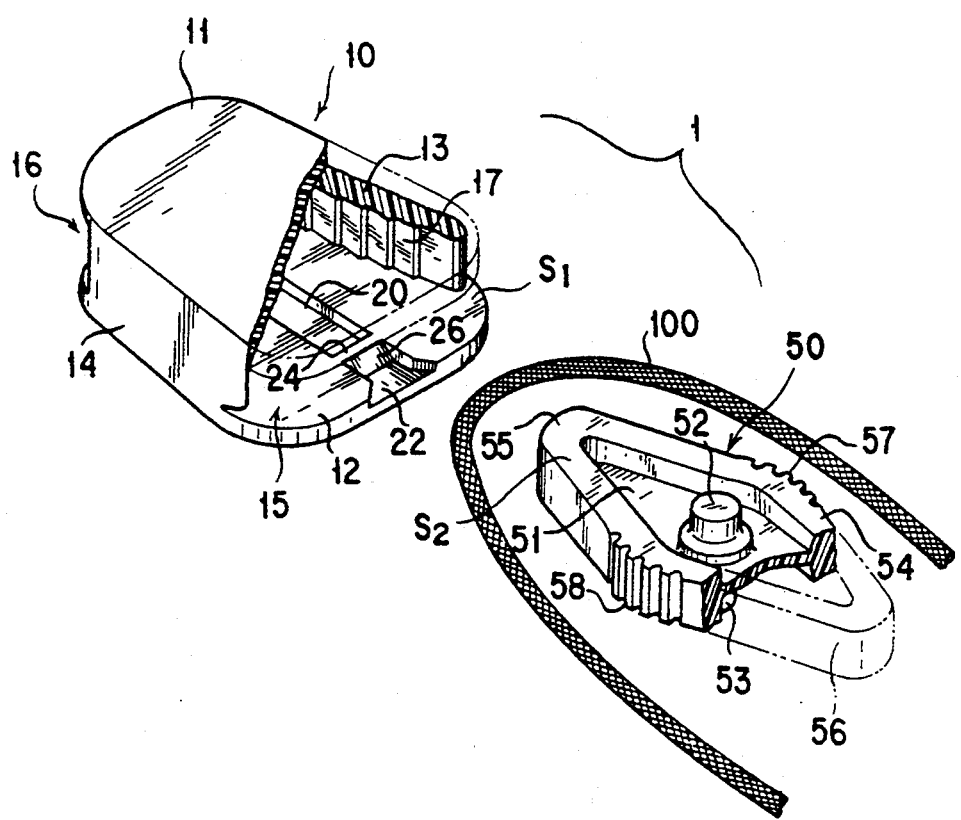
FIG. 1 is a partially cutaway exploded perspective view of a first embodiment of a cord tightening device according to the present invention.

Referring to the drawings, FIGS. 1 to 5 illustrate a first embodiment of the cord tightening device of the present invention. A cord tightening device 1 made of synthetic resin is composed of a case or hollow body 10 and a sliding member 50 which are separate components. The case 10 is composed of a front plate 11 and a rear plate 12 having an identical top view of the general shape of a snake's head or trapezoid and opposite lateral walls 13, 14 integrally formed between the front plate 11 and the rear plate 12 so as to interconnect the opposite lateral parts thereof. The inner surfaces of the opposite lateral walls 13, 14 are opposed to each other in a forwardly converging manner. Thus, the case 10 assumes the shape of a box as a whole. A large-width opening 15 and a small-width opening 16 are formed at the opposite ends of the case 10 and undulating or corrugated surfaces 17, 18 are formed on the inner surfaces of the opposite lateral walls 13, 14. These surfaces 17, 18 may be in the form of a coarse, surface. On the longitudinal center lines of the inner surfaces, or sliding surfaces $S_1$, respectively of the front plate 11 and the rear plate 12, sliding grooves 19, 21 and 20, 22 are formed in the direction from the leading end to the trailing end so that the sliding member 50 may be slid in the longitudinal direction of the case 10 from the opening 15 to the opening 16. Regulating parts 23, 24 resembling a weir are raised between the sliding grooves 19 and 21 of the front plate 11 and between the sliding grooves 20 and 22 of the rear plate 12 nearer to the large-width opening 15 at the rear end so as to separate the sliding grooves 19 and 21 of the front plate 11 and the sliding grooves 20 and 22 of the rear plate 12. The outer side surfaces of the regulating parts 23, 24 are formed aslant to provide guiding slanted parts 25, 26 for conveniencing the work of inserting sliding protrusions 52, 53 of the sliding member 50. The inner side surfaces of the regulating parts 23, 24 precipitate from the apex parts thereof perpendicularly to the sliding grooves 19, 20. During the insertion of the sliding member 50 into the case 10, when the sliding protrusions 52, 53 of the sliding member 50 ride over the slanted parts 25, 26 of the regulating parts 23, 24 and enter the sliding grooves 19, 20, therefore, the regulating parts 23, 24 prevent the sliding protrusions 52, 53 of the sliding member 50 from throwing off.

The sliding member 50 is provided with a platelike main body 51 having a generally rhombic plan view. Along the periphery of the main body 51 is formed a generally rhombic sliding part 54 of a size such that a slight gap for nipping a cord may remain between the opposite lateral walls 13, 14 of the case 10 when the sliding member 50 is inserted into the case 10. In the central part of the main body 51, the sliding protrusions 52, 53 which have a size such that they may be freely slide inside the sliding grooves 19, 20, 21, and 22 of the case 10 and a height such that they may slightly protrude from the upper and lower surfaces, i.e. sliding surfaces $S_2$, of the sliding part 54 and enter the sliding grooves 19, 20 of the case 10 are raised from the opposite surfaces of the main body 51. The acute angle parts at the opposite ends of the sliding member 50 function as operating parts 55, 56 to be used for manual operation of the sliding member 50 and the opposite lateral parts, namely obtuse angle parts, of the sliding member 50 function as pressing parts 57, 58 to be used for nipping a cord 100 in cooperation with the corrugated surfaces 17, 18 of the opposite lateral walls 13, 14 of the case, 10. The pressing parts 57, 58 are formed with an undulating surface or a coarse surface and opposed respectively to the corrugated surfaces 17, 18 on the insides of the opposite lateral walls 13, 14 of the case 10. The width intervening between the opposite pressing parts 57, 58 of the sliding member 50 is larger than the width of the small-width opening 16 at the leading end of the case 10. The sliding member 50 has a length such that when the sliding member 50 is set in the case 10, the operating parts 55, 56 at the opposite ends of the sliding member 50 may respectively protrude from the small-width opening 16 and the large-width opening 15 of the case 10. The distance between the inner surface of the front plate 11 and the inner surface of the rear plate 12 of the case 10 is roughly equal or slightly larger than the height of the sliding part 54 along the periphery of the sliding member 50. The relation between the inside dimensions of the case and the outside dimentions of the sliding member and the relation between the sliding grooves of the case and the sliding protrusions of the sliding member which have been described above hold good for the embodiments to be cited hereinbelow.

Now, the assembly of the components of the cord tightening device and the operation of the cord tightening device illustrated in FIGS. 1 to 5 will be described below.

Figure 2:
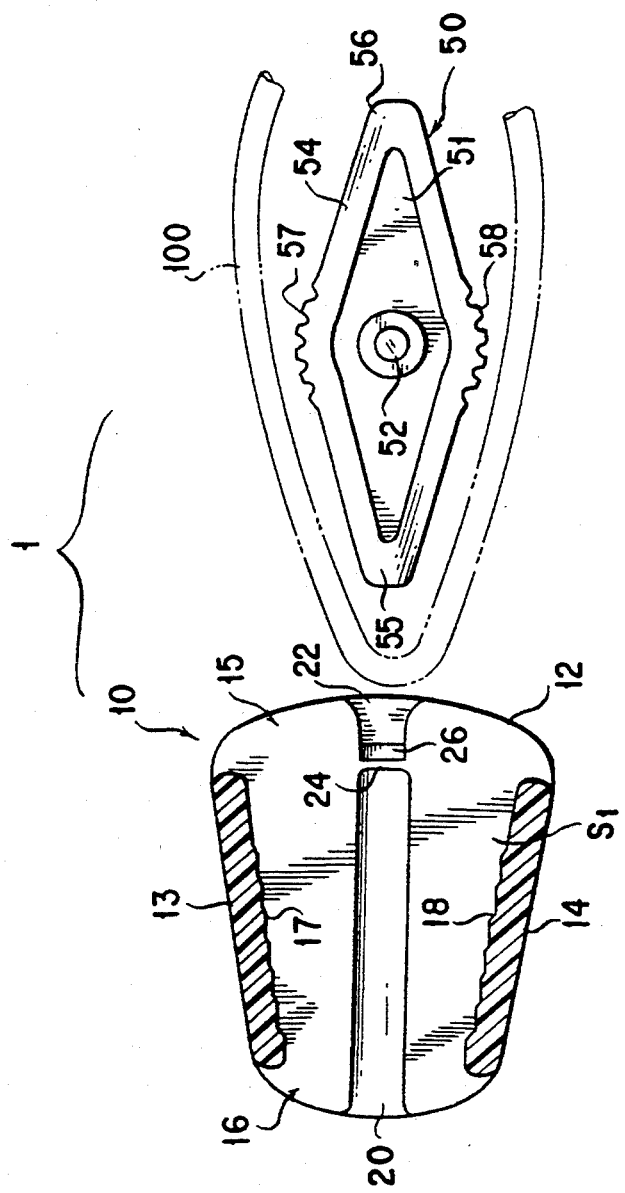
FIG. 2 is a partially cutaway plan view of the cord tightening device shown in FIG. 1.
Figure 3:
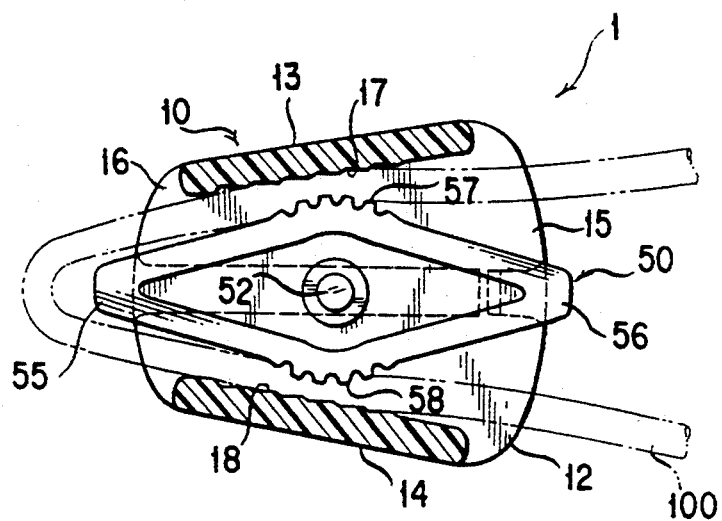
FIG. 3 is a partially cutaway plan view illustrating the cord tightening device of FIG. 1 holding a cord in a tightened state.
Figure 4:
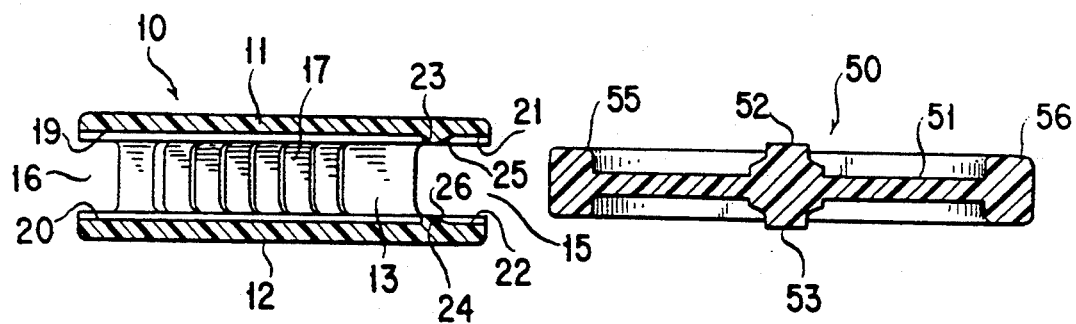
FIG. 4 is a longitudinally sectioned side view of the cord tightening device of FIG. 1 prior to the assembly of the components thereof.
Figure 5:
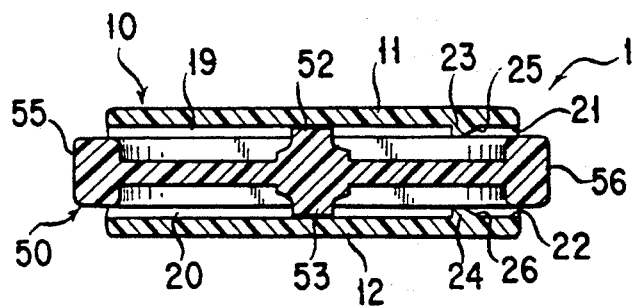
FIG. 5 is a longitudinally sectioned side view of the cord tightening device of FIG. 1 after the assembly of the components thereof.

The cord 100 is nipped between the case 10 and the sliding member 50. Then, as illustrated in FIG. 2 and FIG. 4, the one operating part 55 of the sliding member 50 is posed opposite the sliding grooves 21, 22 on the large-width opening side of the case 10 and inserted through the large-width opening 15 to set the sliding protrusions 52, 53 of the sliding member 50 into engagement with the sliding grooves 21, 22 of the case 10 and the other operating part 56 is pressed. As a result, the sliding protrusions 52, 53 ride over the guiding slanted parts 25, 26 and enter the sliding grooves 19, 20 which are incised in the inner surfaces of the front plate 11 and the rear plate 12 of the case 10 as illustrated in FIG. 3 and FIG. 5.

The sliding member 50 which has been inserted into the case 10 can now be freely slide along the sliding grooves 19, 20 which are formed in the inner surfaces (sliding surfaces $S_1$) of the front plate 11 and the rear plate 12 of the case 10. When the sliding member 50 is slid in the direction of the small-width opening 16 at the leading end of the case 10, the opposite lateral walls 13, 14 of the case 10 and the pressing parts 57, 58 on the opposite lateral parts of the sliding member 50 cooperate to nip and tighten the cord 100 inserted therebetween. The opposite pressing parts 57, 58 of the sliding member 50 have a width larger than the width of the small-width opening 16 at the leading end of the case 10 so that they may not throw off through the opening 16 as described above. Meanwhile, on the large-width opening 15 side, the regulating parts 23, 24 are present in the sliding grooves 19, 20 and, therefore, the sliding protrusions 52, 53 of the sliding member 50 are destined to collide against the regulating parts 23, 24. Once the sliding member 50 has been set in the case 10, the sliding member 50 will not throw off from the case 10.

The operating parts 55, 56 integrally formed in the opposite ends of the sliding member 50 protrude from the opposite openings 15, 16 of the case 10. Thus, the sliding operation of the sliding member 50 can be carried out both simply and infallibly.

The tightening of the cord 100 with the cord tightening device 1 can be loosed by pressing the operating part 55 and moving the sliding member 50 toward the large-width opening 15 at the trailing end.

Figure 6:
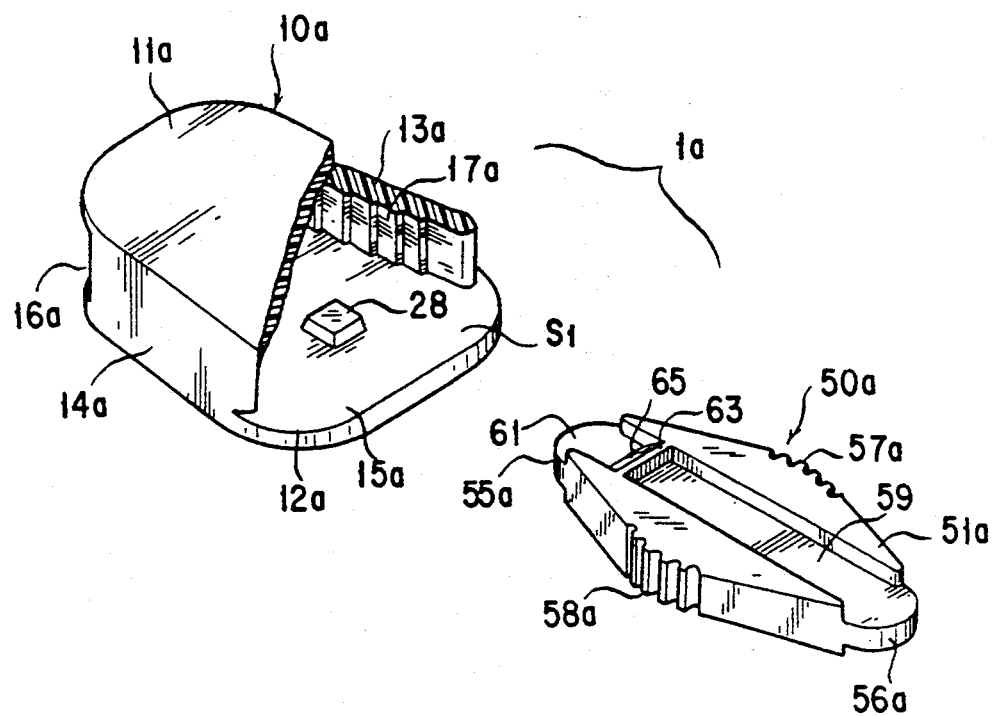
FIG. 6 is a partially cutaway exploded perspective view illustrating a second embodiment of the cord tightening device of the present invention.
Figure 7:
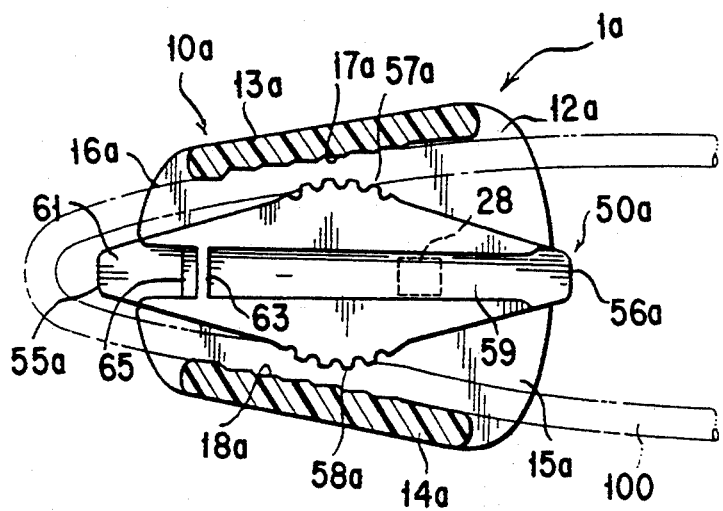
FIG. 7 is a partially cutaway plan view illustrating the cord tightening device of FIG. 6 holding a cord in a tightened state.
Figure 8:
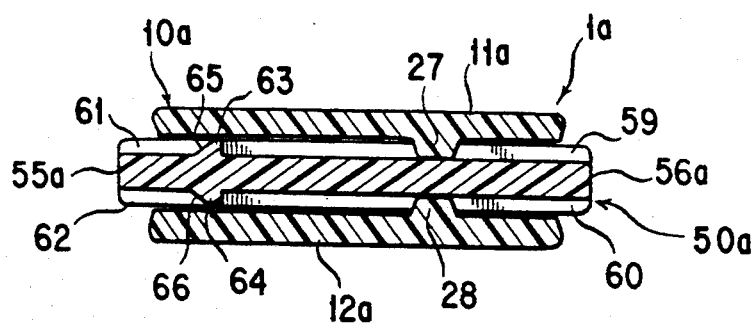
FIG. 8 is a longitudinally sectioned side view of the cord tightening device of FIG. 6 after the assembly of the components thereof.

FIGS. 6 to 8 illustrate a second embodiment of the cord tightening device of the present invention. In a cord tightening device 1a, a case 10a and a sliding member 50a are so shaped as to assume a generally trapezoidal plan view and a generally rhombic plan view, respectively. On the inner surfaces of opposite lateral walls 13a, 14a of the case 10a, undulating or corrugated (or rough) surfaces 17a, 18a are formed. On the opposite lateral surfaces of the sliding member 50a, undulating pressing parts 57a, 58a are respectively formed. Operating parts 55a, 56a are formed in the acute angle parts at the leading and trailing ends of the sliding member 50a. The arrangement of the components described thus far is similar to that of the first embodiment described above.

On the longitudinal center lines of the inner surfaces of the front plate 11a and the rear plate 12a of the case 10a, sliding protrusions 27, 28 are respectively raised nearer to the large-width opening 15a. On the upper and lower surfaces of a main body 51a of the sliding member 50a, sliding grooves 59, 61 and 60, 62 capable of admitting the sliding protrusions 27, 28 of the case 10a are incised in the operating part 55a at the leading end through the operating part 56a at the trailing end. Between the sliding grooves 59 and 61 and between the sliding grooves 60 and 62, regulating parts 63, 64 of the shape of a weir for preventing the sliding protrusions from throwing off are 10 formed nearer to the leading end of the case 10a. The inner side surfaces of the regulating parts 63, 64 are in the form of an upright wall and the outer side surfaces thereof are slanted to form outwardly slanted parts 65, 66 to be used for guiding the sliding protrusions 27, 28. The lateral surfaces on the large-width opening 15a side of the sliding protrusions 27, 28 of the case 10a are desired to be slanted.

The assembly of the case 10a and the sliding member 50a is attained by opposing the operating part 55a on the side of the sliding member 50a having the regulating parts 63, 64 disposed thereon to the large-width opening 15a of the case 10a as illustrated in FIG. 6, then causing the sliding grooves 61, 62 at the leading end of the sliding member 50a to be meshed with the sliding protrusions 27, 28 of the case 10a, pressing the other operating part 56a until the sliding protrusions 27, 28 ride over the slanted parts 65, 66 and enter the sliding grooves 59, 60 on the inner side thereof as illustrated in FIG. 7 and FIG. 8, and consequently enabling the operating part 55a at the leading end to be exposed through the small-width opening 16a at the leading end of the case 10a. As a result, the cord tightening device 1a is assembled so that the sliding member 50a may be freely slide inside the case 10a in the longitudinal direction thereof.

Figure 9:
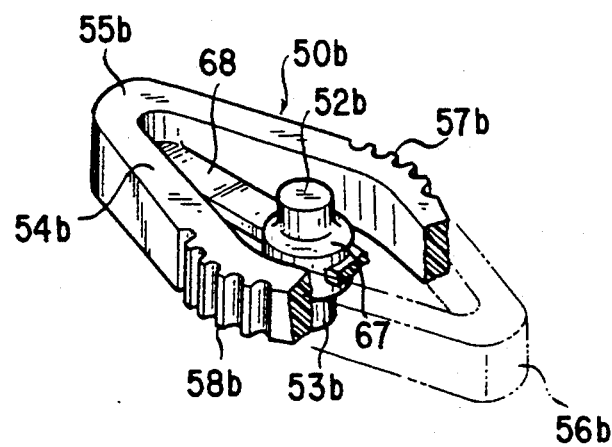
FIG. 9 a perspective view of a sliding member used in a third embodiment of the cord tightening device of the present invention.
Figure 10:
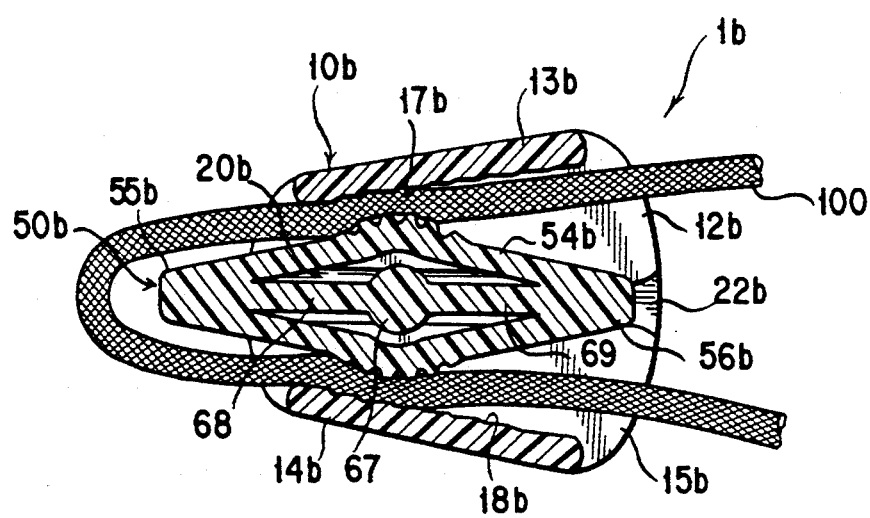
FIG. 10 is a laterally sectioned plan view illustrating the cord tightening device using the sliding member shown in FIG. 9 and holding a cord in a tightened state.

In a third embodiment of the cord tightening device illustrated in FIG. 9 and FIG. 10, a case 10b is roughly similar in shape to the case 10 of the first embodiment. On the inner 10 surfaces of opposite lateral walls 13b, 14b, undulating or corrugated surfaces 17b, 18b are respectively formed. A slanted part and regulating part (not shown) are provided between sliding grooves 20b, 22b of the rear plate 12b (with front plate 11b, slanted part, regulating part and sliding grooves 19b, 21b thereof omitted from illustration).

A sliding member 50b is similar to the sliding member 50 of the first embodiment in having a rhombic plan view and is dissimilar thereto in having a rhombic frame-like sliding part 54b disposed around a disc 67 having sliding protrusions 52b, 53b raised from the upper and lower surfaces thereof and bridging parts 68, 69 interconnecting the operating parts 55b, 56b at the opposite ends of the sliding part 54b and the disc 67. The sliding protrusions 52b, 53b raised from the upper and lower surfaces of the disc 67 are so high as to protrude slightly from the upper and lower surfaces of the frame-like sliding part 54b similarly to the sliding protrusions 52, 53 of the first embodiment. The obtuse angle parts of the opposite lateral surfaces of the sliding part 54b function as pressing parts 57b, 58b opposed to the corrugated surfaces 17b, 18b of the case 10b and the surfaces of these pressing parts 57b, 58b have an undulating surface. The bridging parts 68, 69 which support the sliding protrusions 52b, 53b in the manner described above may be otherwise formed in the shape of a supporting lever projecting from either of the operating parts 55b and 56b.

The assembly of this cord tightening device 1b is attained by inserting the one operating part 55b of the sliding member 50b through the large-width opening 15b of the case 10b, causing the sliding protrusions 52b, 53b to be meshed with the sliding grooves (21b) 22b of the case 10b, and then pressing the other operating part 56b until the sliding protrusions 52b, 53b ride over the guiding slanted parts and enter the sliding grooves (19b) 20b formed in the inner surfaces of the front plate 11b (not shown) and the rear plate 12b of the case 10b as illustrated in FIG. 10. Thus, the sliding member 50b can be freely slide in the case 10b. In the sliding member 50b of the present embodiment, since the opposite lateral parts of the frame-like sliding part 54b and the bridging parts 68, 69 are separated from each other, the pressing parts 57b, 58b are endowed with springiness so as to contact resiliently the corrugated surfaces 17b, 18b of the case 10b.

Figure 11:
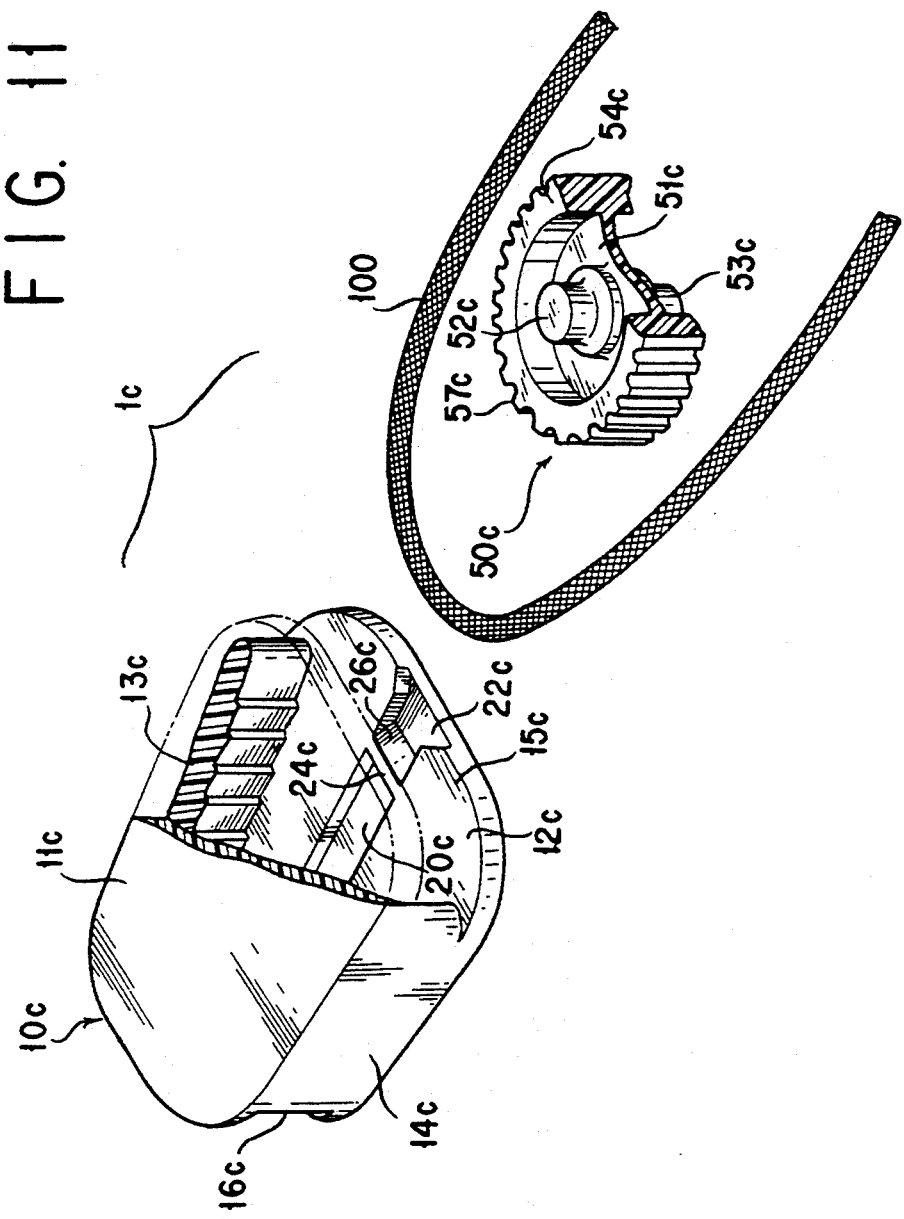
FIG. 11 is a partially cutaway exploded perspective view illustrating a fourth embodiment of the cord tightening device of the present invention.
Figure 12:
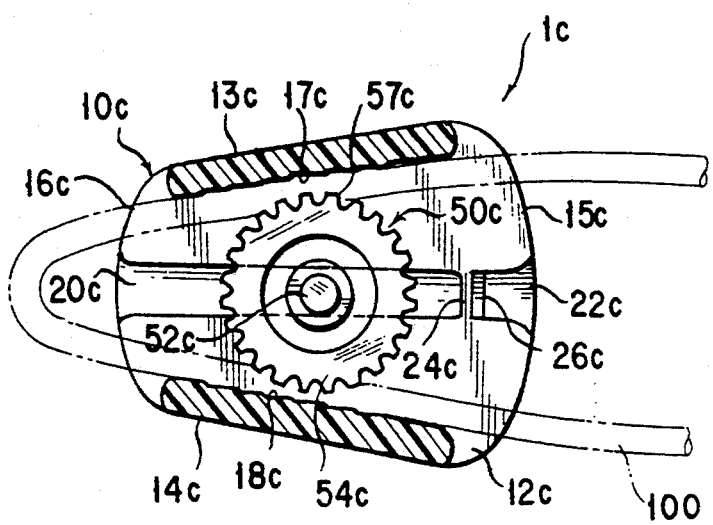
FIG. 12 is a partially cutaway plan view illustrating the cord tightening device of FIG. 11 holding a cord in a tightened state.
Figure 13:
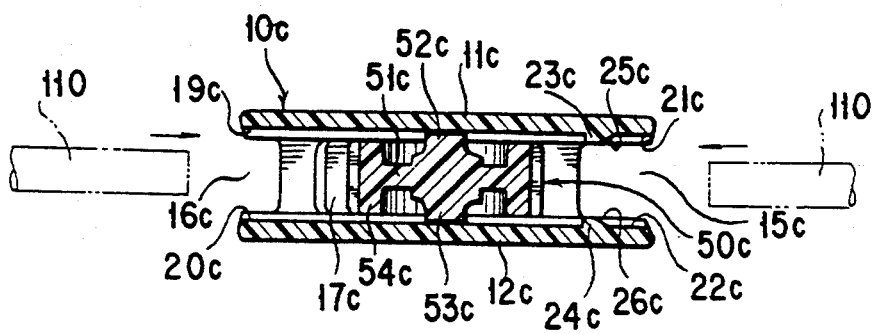
FIG. 13 is a longitudinally sectioned side view of the cord tightening device of FIG. 11 after the assembly of the components thereof.

A fourth embodiment of the cord tightening device illustrated in FIGS. 11 to 13 is composed of a case 10c and a sliding member 50c. The case 10c is substantially similar in shape to the case 10 of the first embodiment. On the inner surfaces of opposite lateral walls 13c, 14c, undulating or corrugated surfaces 17c, 18c are respectively formed. Sliding grooves 19c, 21c and 20c, 22c are formed in the inner surfaces of a front plate 11c and a rear plate 12c. Between the sliding grooves 19c and 21c of the front plate 11c and between the sliding grooves 20c and 22c of the rear plate 12c, regulating parts 23c, 24c for preventing the sliding member from throwing off are respectively formed projectingly nearer to a large-width opening 15c. The outer side surfaces of the regulating parts 23c, 24c are slanted to form slanted parts 25c, 26c which are to be used for guiding the sliding protrusions 52c, 53c of the sliding member 50c.

The sliding member 50c has a circular plan view and is composed of a platelike member 51c and an annular sliding part 54c formed along the periphery of the platelike member 51c. The outer periphery of the sliding part 54c is undulated after the fashion of a toothed wheel to form a pressing part 57c resembling a gear. At the center of the platelike member 51c, sliding protrusions 52c, 53c so high as to protrude slightly from the upper and lower surfaces of the sliding part 54c are raised from the upper and lower surfaces of the platelike member 51c. These sliding protrusions 52c, 53c are so adapted as to be meshed with the sliding grooves 19c, 21c, and 20c, 22c of the case 10c.

This cord tightening device 1c is completed by setting the annular sliding member 50c as opposed to the large-width opening 15c of the case 10c as illustrated in FIG. 11, then pushing the sliding member 50c into the case 10c with the aid of a pushing rod 110 as illustrated in FIG. 13 thereby causing the sliding protrusions 52c, 53c of the sliding member 50c to pass through the sliding grooves 21c, 22c of the case 10c, ride over the slanted parts 25c, 26c of the regulating parts 23c, 24c for guiding the sliding protrusions, and enter the sliding grooves 19c, 20c formed respectively in the inner surfaces of the front plate 11c and the rear plate 12c as illustrated in FIG. 12 and FIG. 13, and enabling the sliding member 50c to be set freely slidably in the case 10c. The sliding member 50c which is thus disposed inside the case 10c can freely slide in the sliding groves 19c, 20c and, at the same time, freely rotate in itself. Thus, a cord 100 can be nipped at any point of the pressing part 57c which is formed on the entire circumference of the sliding member 50c. The cord 100 can be relieved of the tightened state by causing the sliding member 50c to be positively moved in the direction of the large-width opening 15c of the case 10c. To be specific, the cord 100 is relieved of its tightened state by forcibly inserting the push rod 110 into the case 10c from the small-width opening 16c side thereby moving the sliding member 50c toward the large-width opening 15c.

Figure 14:
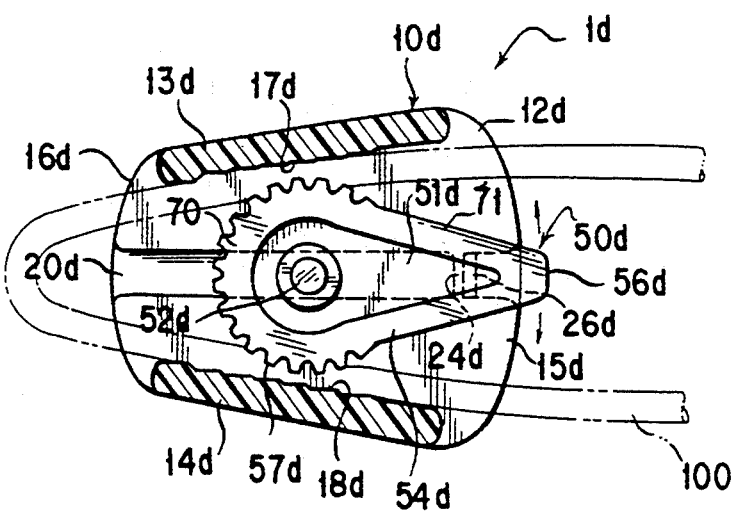
FIG. 14 is a partially cutaway plan view illustrating a fifth embodiment of the cord tightening device of the present invention holding a cord in a tightened state.
Figure 15:
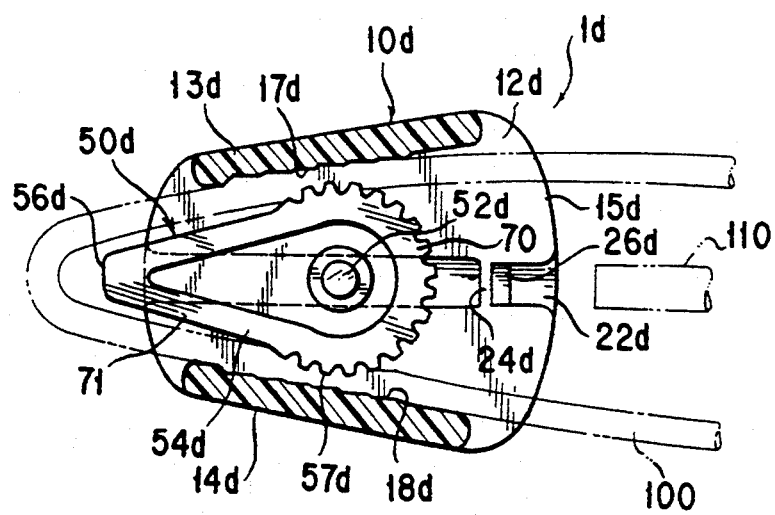
FIG. 15 is a partially cutaway plan view illustrating the cord tightening device of FIG. 14 holding a cord in another tightened state.

A fifth embodiment of the cord tightening device illustrated in FIG. 14 and FIG. 15 is also composed of a case 10d and a sliding member 50d. The case 10d is substantially similar in shape to the case 10 of the first embodiment. Undulating or corrugated surfaces 17d, 18d are formed in the inner surfaces of opposite lateral walls 13d, 14d of the case 10d. Between sliding grooves 19d and 21d and between sliding grooves 20d and 22d which are formed in the inner surfaces of a front plate 11d (not shown) and a rear plate 12d from the leading end through the trailing end thereof (the sliding grooves 19d, 21d of the front plate 11d not shown), regulating parts 23d, 24d for preventing the sliding member from throwing off are formed (the regulating part 23d of the front not shown). The outer side surfaces of the regulating parts 24d (23d) are slanted to form slanted parts 26d (25d) to be used for guiding sliding protrusions of the sliding member.

The sliding member 50d has a generally waterdrop-like plan view. A sliding part 54d formed along the periphery of a platelike member 51d roughly resembling a waterdrop in shape is composed of a circular head part 70 and a part 71 having a triangular plan view. A pressing part 57d resembling an undulated toothwheel is formed on the outer circumferential surface of the circular head part 70. The end part of the triangular part 71 functions as an operating part 56d. Sliding protrusions 52d, 53d (the protrusion 53d not shown) are raised from the upper and lower surfaces of the platelike member 51d at the center of the head part 70. The sliding protrusions 52d, 53d which are so high as to protrude slightly from the upper and lower surfaces of the sliding part 54d are adapted to be meshed with the sliding grooves of the case 10d.

In the cord tightening device 1d illustrated in FIG. 14, the assembly of the sliding member 50d and the case 10d is attained by inserting the sliding member 50d, with the head part 70 side thereof in the lead, into the large-width opening 15d of the case 10d and then pressing the operating part 56d thereby causing the sliding protrusions 52d (53d) to ride over the slanted parts 26d (25d) of the regulating parts 24d (23d) and enter the sliding grooves 20d (19d). This cord tightening device 1d is so formed that the operating part 56d of the sliding member 50d may be laterally shaken more or less in the direction of the arrows. The tightened state of a cord can be slightly adjusted by shaking the operating part 56d.

FIG. 15 depicts another mode of using the cord tightening device 1d illustrted in FIG. 14. The assembly of the case 10d and the sliding member 50d is attained, unlike the manner shown in FIG. 14, by causing the operating part 56d which is reversely laid out to be opposed to the large-width opening 15d of the case 10d, inserting the sliding member 50d from the operating part 56d side into the case 10d, and pressing the head part 70 of the sliding member 50d with the aid of the push rod 110 thereby causing the sliding protrusions 52d (53d) to ride over the slanted parts (25d) 26d of the regulating parts (23d) 24d and enter the sliding grooves (19d) 20d of the case 10d. Also in the present manner of use, the operating part 56d of the sliding member 50d can be laterally shaken more or less relative to the case 10d.

Figure 16:
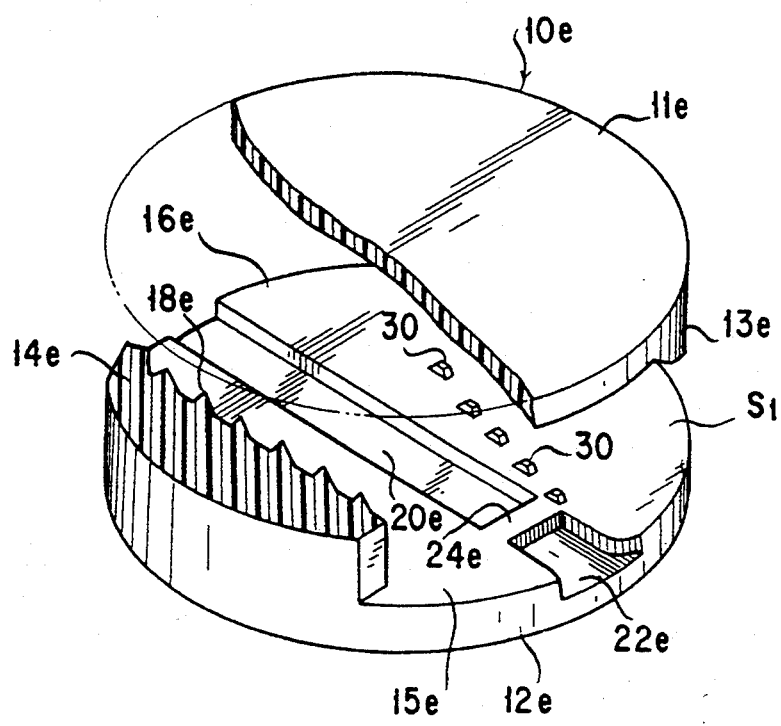
FIG. 16 is a partially cutaway perspective view of a case used in a sixth embodiment of the cord tightening device of the present invention.
Figure 17:
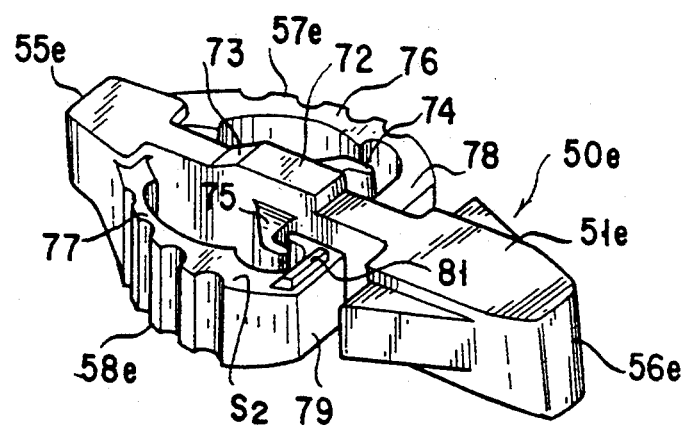
FIG. 17 is a perspective view of a sliding member used in the case of the cord tightening device of FIG. 16 and held in a reversed state.
Figure 18:
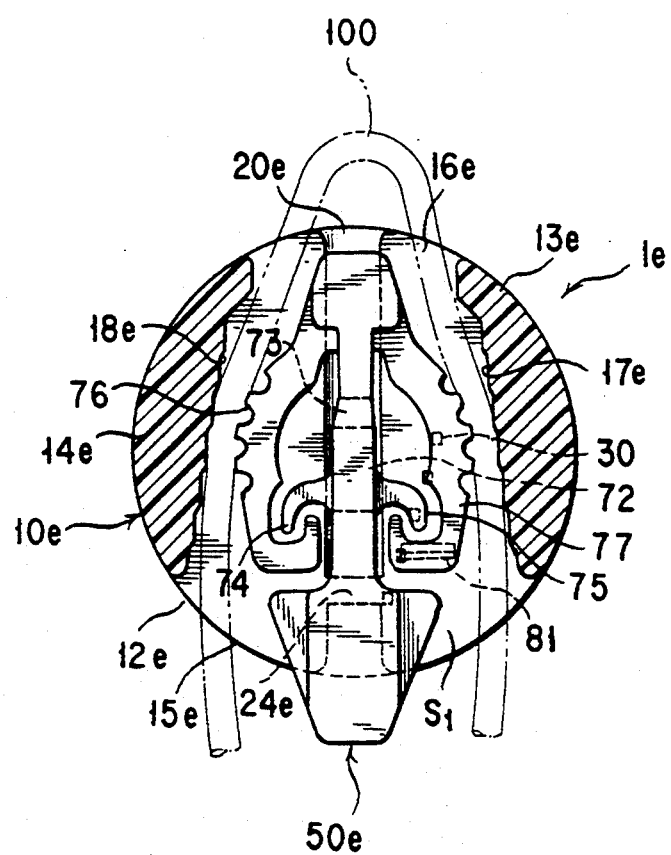
FIG. 18 a partially cutaway plan view illustrating a cord tighten device using the case of FIG. 16 and the sliding member of FIG. 17 and holding a cord in a tightened state.

FIGS. 16 to 18 illustrate a sixth embodiment of the cord tightening device of the present invention. A case 10e of the cord tightening device 1e comprises a front plate 11e and a rear plate 12e, both in a circular shape, and opposite lateral walls 13e, 14e disposed between the opposite lateral parts of the front plate 11e and the rear plate 12e as opposed to each other, as shown in FIG. 16. Openings 15e, 16e are formed between the opposite end parts of the lateral walls 13e, 14e. The distance between the opposite lateral walls 13e, 14e of the case 10e is decreased in the direction of the leading end side of the case 10e so as to give rise to the small-width opening 16e. On the inner surfaces of the lateral walls 13e, 14e, corrugated surfaces 17e, 18e are respectively formed. In the sliding surface $S_1$ of the rear plate 12e, sliding grooves 20e, 22e are formed from the small-width opening 16e through the large-width opening 15e. Between these sliding grooves 20e and 22e, a regulating part 24e is formed nearer to the large-width opening 15e. Further, on the sliding surface $S_1$ along one side of the sliding grooves 20e, 22e, a plurality of small engaging projections 30 are arranged in a longitudinal row. On the front plate 11e, neither sliding grooves nor engaging projections are formed.

The sliding member 50e is composed of a main body 51e provided in the leading end thereof with an operating part 55e of a generally trapezoidal plan view and in the trailing end thereof with an operating part 56e of an arrowhead-like plan view and a pair of arm parts 76, 77 protruding arcuately along the opposite lateral surfaces of the main body 51e from the opposite sides of the operating part 55e at the leading end in the direction of the operating part 56e at the trailing end, as shown in FIG. 17. At the center on one surface (upper surface in the bearings of FIG. 17) of the main body 51e, a sliding protrusion 72 adapted to be inserted and slid in the sliding grooves 20e, 22e formed in the rear plate 12e of the case 10e is raised. The front side surface of the sliding protrusion 72 is slanted to form a slated part 73. On the opposite lateral surfaces in the generally central part of the main body 51e, hooklike projecting pieces 74, 75 having the leading ends thereof recurved backwardly are respectively raised. The free ends of the opposite arm parts 76, 77 which protrude from the opposite sides of the operating part 55e are shakable. On the outer side surfaces of the arm parts 76, 77 which are destined to be opposed to the corrugated surfaces 17e, 18e of the opposite lateral walls 13e, 14e of the case 10e when the sliding member 50e is inserted into the case 10e, undulating pressing parts 57e, 58e are respectively formed. Further, the free ends of the arm parts 76, 77 are bent in the direction of the lateral surfaces of the main body 51e to form hook parts 78, 79 having the general shape o,f the letter L. The leading ends of the hook parts 78, 79 assume their positions between the hooklike projecting pieces 74, 75 raised from the opposite lateral surfaces of the main body 51e and the lateral surfaces of the main body 51e so as to limit the oscillations of the arcuate arm parts 76, 77 within fixed ranges between the main body 51e arid the projecting pieces 74, 75. Thus, the arm parts 76, 77 are prevented from sustaining breakage when they are accidentally spread apart. One engaging ridge 81 is provided in the lateral direction on the sliding surface $S_2$ of the hooked part 79 (the upper surface of the hooked part 79 in the bearings of FIG. 17) at the free end of the one arm part 77 which is destined to confront the engaging projection 30 provided on the sliding surface S1 of the rear plate 12e of the case 10e when the sliding member 50e is set in the case 10e. Optionally, a plurality of such engaging ridges 81 may be provided along the arm part 77.

The incorporation of the sliding member 50e into the case 10e is attained by causing the surface of the sliding member 50e on which the engaging ridge 81 is provided to confront the engaging projection 30 provided on the sliding surface $S_1$ of the rear plate 12e of the case 10e, inserting the operating part 55e of the sliding member 50e into the large-width opening 15e of the case 10e, and pressing the operating part 56e thereby causing the sliding protrusion 72 to ride over the regulating part 24e and enter the sliding groove 20e as shown in FIG. 18. Since the engaging ridge 81 is allowed to detachably engage with the engaging projection 30 of the rear plate 12e when the sliding member 50e slides inside the case 10e, the position of engagement between the engaging ridge 81 and the engaging projection 30 can be adjusted in conformity with the diameter of the cord.

In the third and sixth embodiments mentioned above, the pressing parts disposed on the opposite lateral surfaces of the sliding member are endowed with springiness and particularly provided with arm parts and, therefore, are allowed to contact the lateral walls of the case gently and gradually. Thus, these embodiments bring about an effect of imposing no injury on a cord and enabling the cord to offer a long service life.

Figure 19:
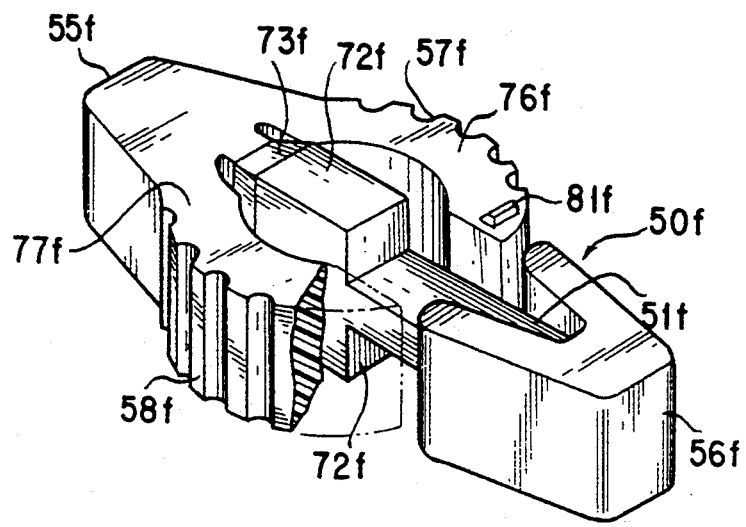
FIG. 19 is a perspective view of another example of the sliding member used in the cord tightening device of the present invention.
Figure 20:
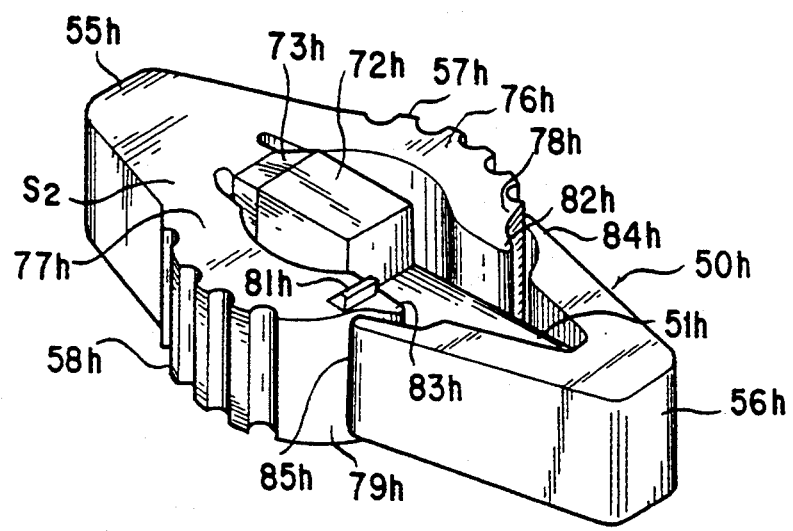
FIG. 20 is a perspective view of still another example of the sliding member.
Figure 21:
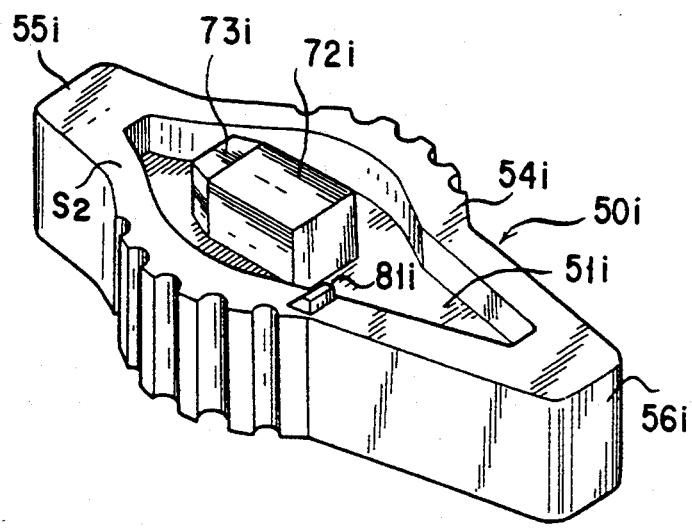
FIG. 21 is a perspective view of yet another example of the sliding member.

FIGS. 19 to 21 illustrate modifications of the sliding member of the preceding embodiment.

A sliding member 50f shown in FIG. 19 is composed of a main body 51f provided at the leading end thereof with a generally trapezoidal operating part 55f and at the training end thereof with an arrowhead-shaped operating part 56f and a pair of arm parts 76f, 77f. The arm parts 76f, 77f projected arcuately from the opposite sides of the operating part 55f in the direction of the operating part 56f are adapted so as to be freely shaken. Engaging ridges 81f are disposed in the lateral direction on the upper and lower surfaces of the free end of the one arm part 76f. Thus, this sliding member 50f can be used in a case which is provided with engaging projections one each on the sliding surfaces $S_1$ of the front plate and the rear plate. Sliding protrusions 72f, 72f are provided on the upper and lower surfaces in the central part of the main body 51f so that the main body 51f may be inserted into a case of the kind which has sliding grooves formed in the inner surfaces of both the front plate and the rear plate of the case. The front side surface of the lower sliding protrusion 72f, though not shown, is slanted to form a slanted part similar to the slanted part 73f on the upper surface. The present embodiment is similar to the preceding embodiment in having the undulating pressing parts 57f, 58f formed respectively on the outer side surfaces of the arm parts 76f, 77f.

A sliding member 50h shown in FIG. 20 is dissimilar to the sliding member 50f shown in FIG. 19 in regulating the oscillation of arm parts 76h, 77h projected arcuately from the opposite lateral surfaces of an operating part 55h at the leading end of a main body 51h. To be specific, projecting pieces 82h, 83h are raised respectively from free ends 78h, 79h of the arm parts 76h, 7h along the main body 51h. On the other hand, projecting pieces 84h, 85h are raised from the terminal of the arrowhead-shaped operating part 56h so as to assume positions outside the projecting pieces 82h, 83h. As a result, the oscillation of the arm parts 76h, 77h is limited to the gaps intervening between the projecting pieces 84h, 85h of the operating part 56h and the main body 51h. Thus, the arm parts 76h, 77h are prevented from sustaining breakage when they are accidentally spread apart. The sliding member 50h in this embodiment is similar to the sliding member shown in FIG. 17 in having an engaging ridge 81h formed on the sliding surface $S_2$ at the free end 79h of the one arm part 77h, undulating pressing parts 57h, 58h formed on the outer side surfaces of both arm parts 76h, 77h, and a sliding protrusion 72h and a slanted part 73h formed on the one surface of the main body 51h.

A sliding member 50i shown in FIG. 21 is composed of a wholly integrally formed main body 51i and a generally elliptical sliding part 54i formed along the periphery of the main body 51i. Generally trapezoidal operating parts 55i, 56i are provided at the opposite ends of the sliding part 54i. An engaging ridge 81i is raised from the one sliding surface $S_2$. In the generally central part of the main body 51i, a sliding protrusion 72i and a slanted part 73i are formed so as to protrude from the sliding surface $S_2$ of the sliding part 54i.

Figure 22:
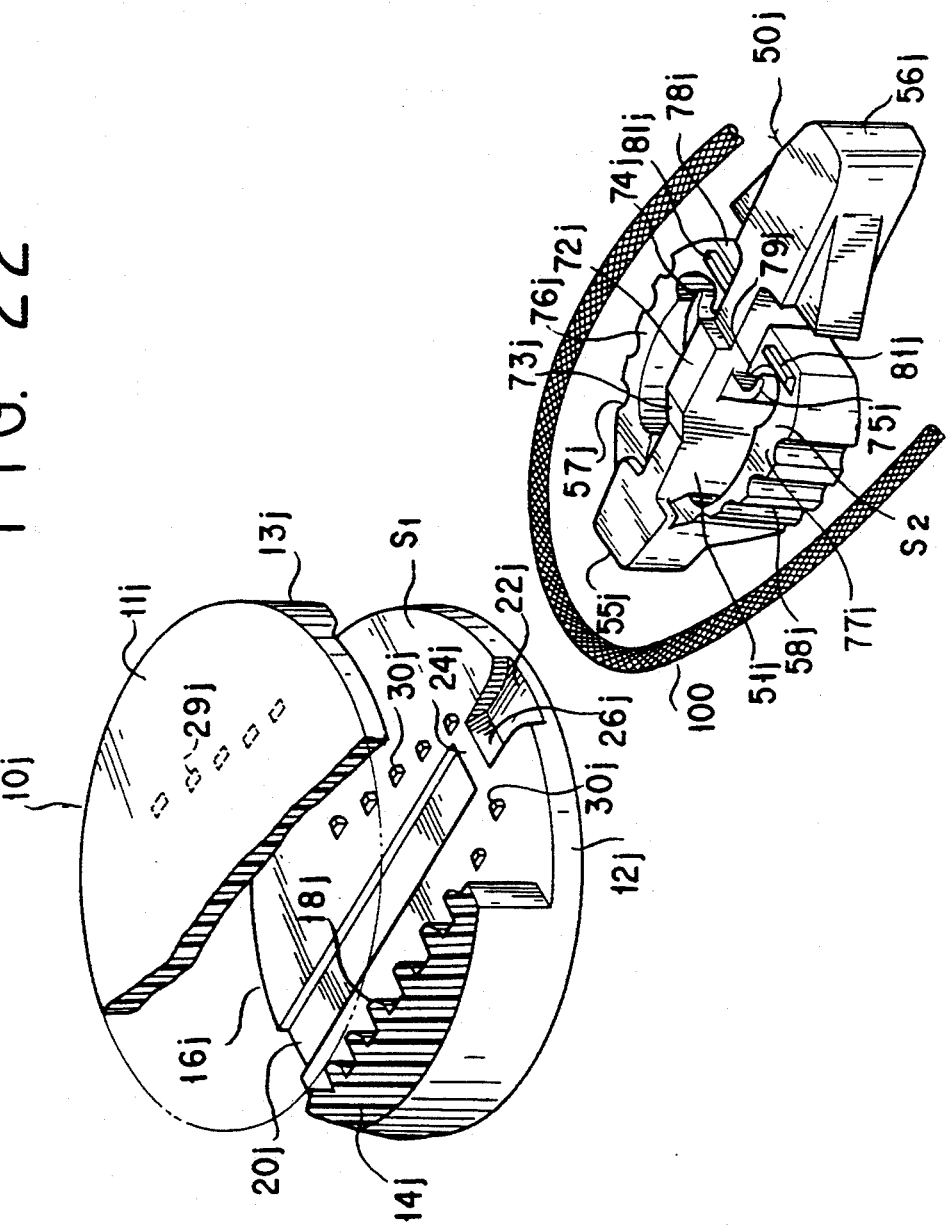
FIG. 22 is a partially cutaway exploded perspective view of a seventh embodiment of the cord tightening device of the present invention prior to holding a cord in a tightened state.
Figure 23:
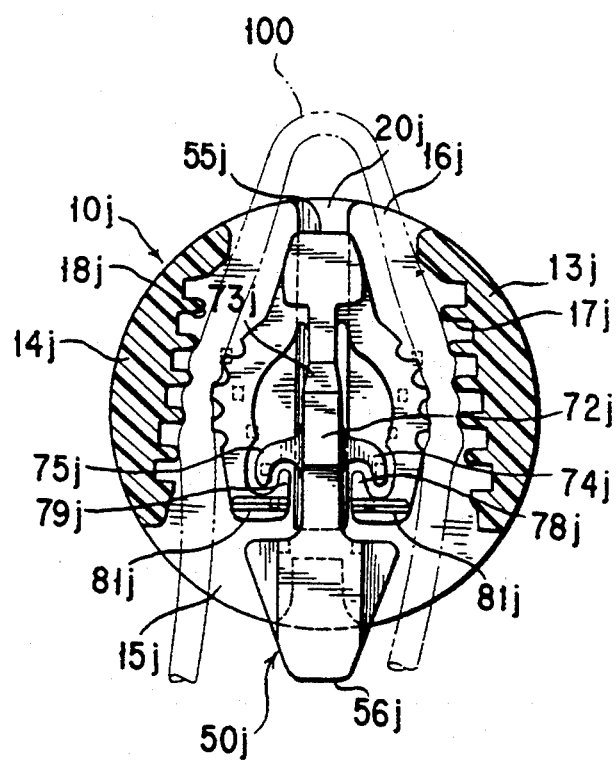
FIG. 23 is a partially cutaway plan view of the cord tightening device of FIG. 22 holding a cord in a tightened state.
Figure 24:
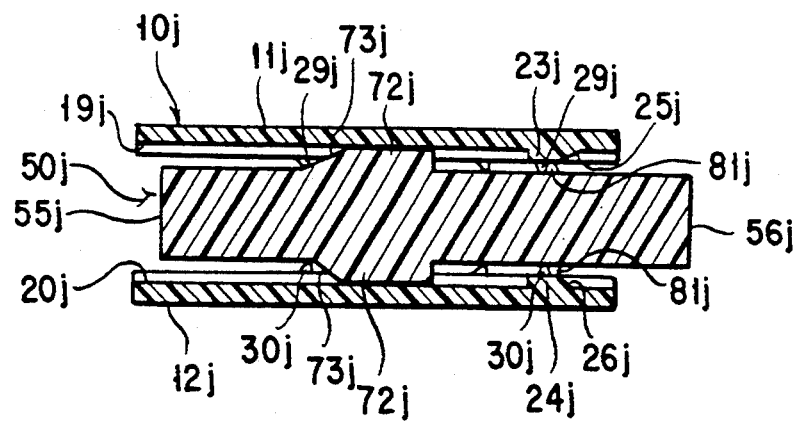
FIG. 24 is a longitudinally sectioned side view illustrating the assembly of the case and the sliding member of the cord tightening device of FIG. 22.

Then, in a seventh embodiment illustrated in FIGS. 22 to 24, sliding grooves 19j, 21j and 20j, 22j are formed in the inner surfaces of both a front plate 11j and a rear plate 12j of a case 10j as directed toward openings 15j, 16j. Regulating parts 23j, 24j are provided between the sliding grooves 19j and 21j and between the sliding grooves 20j and 22j. Slanted parts 25j, 26j are formed respectively on the outer side surfaces of the regulating parts 23j, 24j. A plurality of engaging projections 29j, 30j are arranged each in a longitudinal row on the sliding surfaces S₁ along the opposite sides of the sliding grooves 19j, 21j and 20j, 22j respectively of the front plate 11j and the rear plate 12j. Further, undulating surfaces 17j, 18j are formed on the inner surfaces respectively of the opposite lateral walls 13j, 14j of the case 10j.

A sliding member 50j is provided at one end thereof with a sagittate operating part 56j and at the other end thereof with a trapezoidal operating part 55j. Arcuate arm parts 76j, 77j are raised one each from the opposite sides of the operating part 55j. On the outer surfaces of the arm parts 76j, 77j, undulating pressing parts 57j, 58j are respectively formed. The free ends of the arm parts 76j, 77j are bent toward the main body 51j to form hooked parts 78j, 79j of the general shape of the letter L. Hooklike projecting pieces 74j, 75j are provided one each on the opposite lateral surfaces in the generally central part of the main body 51j. The leading ends of these hooklike projecting pieces 74j, 75j are formed so as to assume their positions between the respective hooked parts 78j, 79j of the arm parts and the arc parts 76j, 77j. The oscillation of the arm parts 76j, 77j is limited to the gaps which intervene between the lateral surfaces of the main body 51j and the projecting pieces 74j, 75j.

In the generally central parts of the upper and lower sliding surfaces S₂ of the main body 51j of the sliding member 50j, sliding protrusions 72j are raised. The front side surfaces of the sliding protrusions 72j are slanted to form slanted parts 73j. After the sliding member 50j has been inserted into the case 10j and the sliding protrusions 72j of the sliding member 50j have been meshed with the opposed sliding grooves 19j, 20j of the case 10j as shown in FIGS. 23 and 24, therefore, the otherwise possible throw-off of the sliding member 50j is curbed by the collision of the sliding protrusions 72j against the regulating parts 24j. One engaging ridge 81j are provided in the lateral direction on each of the upper and lower surfaces of the free ends of the arm parts 76j, 77j so as to detachably engage with the opposed engaging projections 29j, 30j of the case 10j.

In the sixth and seventh embodiments mentioned above, the plurality of engaging projections 30, 29j, 30j raised from the sliding surfaces S₁ of the case and the engaging ridges 81, 81j provided on the opposed sliding surfaces S₂ of the sliding member are so formed that they may detachably engage each other and, as a result, the engagement between the case and the sliding member will not be accidentally broken. Thus, there can be obtained an effect of retaining the ability to nip a cord infallibly for a long time. The effectiveness of this nipping action can be exalted particularly when the engagement is produced on the opposite sides of the sliding grooves.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by foregoing description and all changes which come within the meaning and range of equivalency of the claims are, therefore, intended to be embraced therein.

What is claimed is:

1. A cord tightening device comprising:
   (a) a case having a pair of front and rear plates whose two inside surfaces function as sliding surfaces and a pair of opposite lateral walls interconnecting said front and rear plates and having forwardly converging inner surfaces defining a small-width opening at one end thereof and a large-width opening at the other end thereof, and
   (b) a sliding member slidably disposed inside said case and having pressing parts formed on opposite lateral surfaces thereof and upper and lower surfaces which function as sliding surfaces, the pressing parts being adapted to press a cord against the opposite lateral walls of said case;
   said cord tightening device having a first sliding groove and a first sliding protrusion fit for insertion into said first sliding groove applied as a set between said front plate and said upper surface, and a second sliding groove and a second sliding protrusion fit for insertion into said second sliding groove applied as a set between said rear plate and said lower surface, at least one of the first and second sliding grooves having a regulating part for preventing a respectively inserted one of said first and second sliding protrusions from throwing off said at least one sliding groove, and a lateral surface of either one of said respectively inserted one sliding protrusion and said regulating part facing each other being slanted for guiding insertion of said respectively inserted sliding protrusion into said at least one sliding groove.

2. A cord tightening device according to claim 1, wherein said sliding member has operating parts integrally formed in leading and trailing ends of said sliding member in such a manner that said operating parts are exposed through opposite openings of said case.

3. A cord tightening device according to claim 1, wherein said pressing parts disposed on the opposite lateral surfaces of said sliding member are endowed with springiness.

4. A cord tightening device according to claim 1, wherein said sliding member has a main body and a pair of arm parts protruding arcuately along opposite lateral surfaces of said main body from one end of said main body in the direction of the other end thereof.

5. A cord tightening device according to claim 1, further comprising a plurality of engaging projections arranged in a longitudinal row on the sliding surface of either one of said case and said sliding member taken as a set and an engaging ridge disposed in a lateral direction on the sliding surface of the other member so that said engaging ridge may detachably engage with said engaging projections.

6. A cord tightening device according to claim 1, wherein said lateral walls of the case have inner corrugated surfaces and said pressing parts of the sliding member have outer undulating surfaces.

7. A cord tightening device according to claim 1, wherein said case has at least one sliding groove extending from the large-width opening end to the small width-opening end on the sliding surface thereof, said sliding groove including a weir-like regulating part whose lateral surface facing to the large-width opening is slanted, and said sliding member comprises a substantially rhombic main body having at least one sliding protrusion fit for insertion into said sliding groove.

8. A cord tightening device according to claim 1, wherein said sliding member comprises a substantially rhombic main body having at least one sliding groove extending between a leading end and a trailing end thereof, said sliding groove including a weir-like regulating part whose lateral surface facing to the leading end is slanted, and said case has on the sliding surface thereof at least one sliding protrusion fit for insertion into said sliding groove.

9. A cord tightening device according to claim 1, wherein said sliding member comprises a disc having at least one sliding protrusion, a rhombic frame-like sliding part disposed around said disc and having undulating lateral surfaces, and a bridging part interconnecting said disc and at least one end of said sliding part.

10. A cord tightening device according to claim 1, wherein said sliding member comprises a main body having at least one sliding protrusion and an annular sliding part formed along said main body and having an undulating circumferential surface.

11. A cord tightening device according to claim 1, wherein said sliding member comprises a main body resembling a waterdrop in shape and having at least one sliding protrusion and a sliding part formed along said main body, a circular part of said sliding part having an undulating circumferential surface.

12. A cord tightening device comprising:
(a) a case having a pair of front and rear plates whose inside surfaces function as sliding surfaces and a pair of opposite lateral walls interconnecting said front and rear plates and having forwardly converging inner surfaces defining a small-width opening at one end thereof and a large-width opening at the other end thereof, and
(b) a sliding member slidably disposed inside said case and having pressing parts formed on opposite lateral surfaces thereof and upper and lower surfaces which function as sliding surfaces, the pressing parts being adapted to press a cord against the opposite lateral walls of said case;
said cord tightening device being provided on at least one sliding surface of either one of said case and said sliding member taken as a set with a sliding groove and on at least one sliding surface of the remaining member of the set with a sliding protrusion fit for insertion into said sliding groove, the sliding groove having a regulating part for preventing said sliding protrusion from throwing off said sliding groove, and a lateral surface of either one of said sliding protrusion and said regulating part facing to the other member being slanted to form a slanted part for guiding insertion of said sliding protrusion into said sliding groove; and
wherein said case has at least one sliding groove formed in at least one sliding surface thereof and said sliding member has at least one sliding protrusion fit for insertion into said sliding groove, said case 1further having a plurality of engaging projections arranged each in a longitudinal row on the sliding surface of said case along the opposite sides of said sliding groove, and said sliding member further having engaging ridges disposed in a lateral direction on the sliding surface of said sliding member facing to said sliding surfacers of the case so that said engaging ridges may detachably engage with said engaging projections.

13. A cord tightening device comprising:
(a) a hollow case provided with a pair of front and rear plates whose inside surfaces functions as sliding surfaces, and a pair of lateral walls disposed in opposite lateral parts of said front plate and said rear plate as opposed to each other so as to form a large-width opening in one end thereof and a small-width opening in the other end thereof and adapted to interconnect said front plate and said rear plate, and
(b) a sliding member slidably disposed inside said case and provided with a main body and a pair of arcuate sliding parts having upper and lower sliding surfaces, disposed in opposite lateral parts of said main body, and adapted to press a cord against the inner surfaces of the lateral walls of said case, said main body and said arcuate sliding parts enclosing therebetween an empty space so that said arcuate sliding parts are endowed with springiness;
said cord tightening device having a first sliding groove extending from a leading end through a trailing end thereof, said first sliding groove including a weir-like regulating part halfway along the entire length thereof, and a first sliding protrusion, said first sliding groove and said first sliding protrusion applied as a set between said front plate and said upper sliding surface of said sliding member, and a second sliding groove extending from a leading end through a trailing end thereof, and a second sliding protrusion, said second sliding groove and said second sliding protrusion applied as a set between said rear plate and said lower sliding surface of said sliding member, a lateral surface of said regulating part opposed to said first sliding protrusion being slanted to form a slanted part.

14. A cord tightening device according to claim 13, wherein said sliding member has operating parts integrally formed in leading and trailing ends of said sliding member in such a manner that said operating parts are exposed through opposite openings of said case.

15. A cord tightening device according to claim 13; further comprising a plurality of engaging projections arranged in a longitudinal row on the sliding surface of either one of said case and said sliding member taken as a set and an engaging ridge disposed in a lateral direction on the sliding surface of the other member so that said engaging ridge may detachably engage with said engaging projections.

16. A cord tightening device according to claim 13; wherein said lateral walls of the case have inner corrugated surfaces and said pressing parts of the sliding member have outer undulating surfaces.

17. A cord tightening device according to claim 13, wherein said case has at least one sliding groove extending from the large-width opening end to the small width-opening end on the sliding surface thereof, said sliding groove including a weir-like regulating part whose lateral surface facing to the large-width opening is slanted, and said sliding member comprises a disc having at least one sliding protrusion, a rhombic frame-like sliding part disposed around said disc and having undulating lateral surfaces, and a bridging part interconnecting said disc and at least one end of said sliding part.

18. A cord tightening device comprising:
(a) a hollow case provided with a pair of front and rear plates whose inside surfaces functions as sliding surfaces, and a pair of lateral walls disposed in opposite lateral parts of said front plate and said rear plate as opposed to each other so as to form a large-width opening in one end thereof and a small-width opening in the other end thereof and adapted to interconnect said front plate and said rear plate, and
(b) a sliding member slidably disposed inside said case and provided with a main body and a pair of arcuate sliding parts having upper and lower sliding surfaces, disposed in opposite lateral parts of said main body, and adapted to press a cord against the inner surfaces of the lateral walls of said case, said main body and said arcuate sliding parts enclosing therebetween an empty space so that said arcuate sliding parts are endowed with springiness;

said cord tightening device being provided on at least one sliding surface of either one of said case and said sliding member taken as a set with a sliding groove extending from a leading end through a trailing end thereof, said sliding groove including a weir-like regulating part halfway along the entire length thereof, and on at least one sliding surface of the other member of said set opposed to said sliding groove with at least one sliding protrusion, a lateral surface of said regulating part opposed to said sliding protrusion being slanted to form a slanted part; and wherein said case has at least one sliding groove formed in at least one sliding surface thereof and said sliding member has at least one sliding protrusion fit for insertion into said sliding groove, said case further having a plurality of engaging projections arranged each in a longitudinal row on the sliding surface of said case along the opposite sides of said sliding groove, and said sliding member further having engaging ridges disposed in a lateral direction on the sliding surface of said sliding member facing to said sliding surface of the case so that said engaging ridges may detachably engage with said engaging projections.

19. A cord tightening device comprising:
(a) a hollow case provided with a front plate, a rear plate, and a pair of lateral walls disposed in opposite lateral parts of said front plate and said rear plate as opposed to each other so as to form a large-width opening in one end thereof and a small-width opening in the other end thereof and adapted to interconnect said front plate and said rear plate, at least one inner surface of either one of said front plate and said rear plate taken as a set having a sliding groove extending from said large-width opening end through said small-width opening end, and said sliding groove including a weir-like regulating part in the proximity of an end part of said large-width opening side thereof, and
(b) a sliding member slidably disposed along said sliding groove inside said case and provided with a main body and a pair of arcuate arm parts disposed in opposite lateral parts of said main body, fixed by one end part thereof to the proximity of a leading end part of said main body, and adapted to press a cord against the inner surfaces of the lateral walls of said case, said main body being provided on at least either one of upper and lower surfaces thereof with a sliding protrusion adapted to be inserted in said sliding groove.

20. A cord tightening device according to claim 19, wherein said lateral walls of the case have inner corrugated surfaces and said arm parts of the sliding member have outer undulating surfaces.

21. A cord tightening device according to claim 19, wherein said sliding member has a substantially trapezoidal operating part in a leading end thereof and a substantially arrowhead-like operating part in a trailing end thereof.

22. A cord tightening device according to claim 19, wherein a lateral surface of said regulating part of the case facing to the large-width opening is slanted to form a slanted part.

23. A cord tightening device according to claim 19, wherein a lateral surface of said sliding protrusion of the sliding member facing to said case is slanted to form a slanted part.

24. A cord tightening device according to claim 19, wherein said main body has in opposite lateral surfaces thereof hooklike projecting pieces having leading ends recurred backwardly, and said arm parts have free ends bent in the direction of lateral surfaces of the main body to form hook parts, leading ends of said hook parts assuming their positions between said hooklike projecting pieces and the lateral surfaces of said main body.

25. A cord tightening device comprising:
(a) a hollow case provided with a front plate, a rear plate, and a pair of lateral walls disposed in opposite lateral parts of said front plate and said rear plate as opposed to each other so as to form a large-width opening in one end thereof and a small-width opening in the other end thereof and adapted to interconnect said front plate and said rear plate, at least one inner surface of either one of said front plate and said rear plate taken as a set having a sliding groove extending from said large-width opening end through said small-width opening end, and said sliding groove including a weir-like regulating part in the proximity of an end part of said large-width opening side thereof, and
(b) a sliding member slidably disposed along said sliding groove inside said case and provided with a main body and a pair of arcuate arm parts disposed in opposite lateral parts of said main body, fixed by one end part thereof to the proximity of a leading end part of said main body, and adapted to press a cord against the inner surfaces of the lateral walls of said case, said main body being provided on at least either one of upper and lower surfaces thereof with a sliding protrusion adapted to be inserted in said sliding groove; and
wherein said case has a plurality of engaging projections arranged in a longitudinal row on the inner surface of either one of said front and rear plates along at least one side of said sliding groove, and said sliding member has at least one engaging ridge disposed in a lateral direction on at least either one of the upper and lower surfaces of said arm part facing to said sliding groove of the case so that said engaging ridge may detachably engage with said engaging projections.

* * * * *